Nov. 6, 1928.
A. M. CURTIS
ELECTRICAL TESTING
Filed Feb. 27, 1926
1,690,280
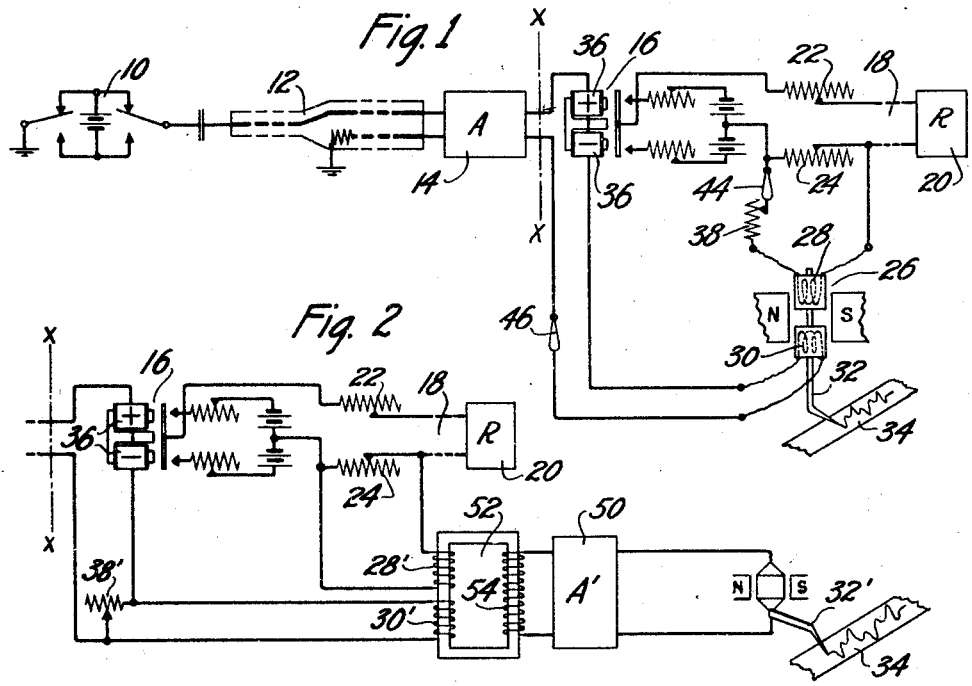
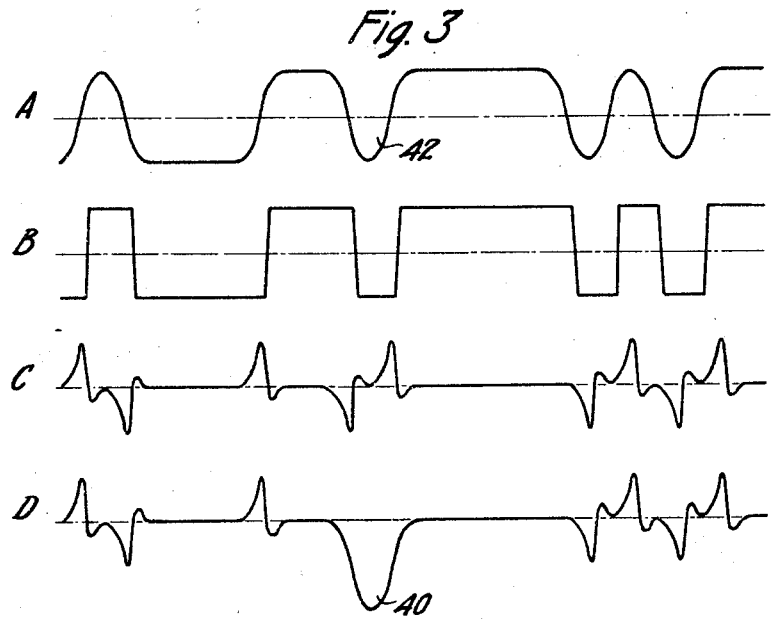
Inventor:
Austen M. Curtis
by E.D. Griggs Atty.

Patented Nov. 6, 1928.

1,690,280

UNITED STATES PATENT OFFICE.

AUSTEN M. CURTIS, OF EAST ORANGE, NEW JERSEY, ASSIGNOR TO BELL TELEPHONE LABORATORIES, INCORPORATED, OF NEW YORK, N. Y., A CORPORATION OF NEW YORK.

ELECTRICAL TESTING.

Application filed February 27, 1926. Serial No. 91,232.

This invention relates to translating circuits and is particularly applicable to electrical testing.

The invention aims to simplify the examination of electrical characteristics, and especially to facilitate observation of the performance of energy translating apparatus, as for example, a relay used to repeat telegraph signals. The invention is of particular use in connection with such relays in submarine cable circuits.

In order to tell whether a relay is correctly repeating signals, two siphon recorders of the type used in submarine cable systems have been used, one recording the signals traversing the winding of the relay and the other recording the signals as repeated by the relay contacts so that the two records could be read and compared for detecting failures of a relay. Such a method is tedious and unsatisfactory.

In accordance with this invention the failures are indicated by a single record, which may be a line on a recorder tape. Moreover, both normal operation and the failures may be noted by observing this record, as it accurately indicates the adjustment of the relay, so that relay bias, or decrease of relay sensitivity become evident.

This record line may be produced by a recorder having differentially acting input circuits or control elements, one energized from the relay input circuit and the other from the relay output circuit, or circuit of the relay contacts in case the relay has relatively movable contacts. For example, a scribing element for marking on a moving recorder tape may be actuated or controlled by an electromagnetic device energized from the input circuit of a relay, and may also be actuated or controlled by an electromagnetic device energized from the circuits of the relay contacts, and the forces exerted by these two electromagnetic devices upon the scribing element may be opposed, and may be relatively adjusted in magnitude so that the scribing element of the recorder will be deflected only when the relay distorts the signals, and will indicate the distortion introduced by the relay. Thus, if the relay were distortionless, the scribing element of the recorder would trace a straight line. In the case of a relay having contacts movable by an actuating winding, there will ordinarily be distortion of the signals by the relay, and consequently the recorder will show the difference between the signals arriving at the relay and the signals leaving the relay. Other defects in the relay operation are made apparent by the trace on the tape, as will be indicated more in detail hereinafter, with reference to the accompanying drawings.

Other objects, aspects and features of the invention will appear from the following description and claims.

In the accompanying drawings, Fig. 1 shows diagrammatically a submarine cable telegraph system embodying one form of the invention;

Fig. 2 shows diagrammatically a part of the system of Fig. 1 but employing a modified form of monitoring circuit and apparatus; and Fig. 3 shows curves for facilitating explanation of the invention.

Referring to Fig. 1, 10 indicates a positive and negative impulse transmitter for sending telegraph signals through a submarine cable 12 to an amplifying and signal shaping network 14. From the network 14 the signals are delivered to a relay 16 which repeats them into a line 18 leading to receiving apparatus 20 embodying automatic printers or any suitable receiving equipment.

The amplifying devices of apparatus 14 may be electric space discharge amplifiers, and the transmitter 10, the cable 12, and the shaping and amplying network 14, or in other words, the portion of the system to the left of line X—X, may be of any suitable form, for example the form disclosed in my Patent 1,624,396, issued April 12, 1927.

Variable resistances 22 and 24 in the line 18 enable the current in the line to be adjusted to the desired value. The line may be of considerable extent, as indicated by its dotted portion in the drawing, and therefore it is desirable that means be provided at the relay 16 for monitoring the signals repeated by the relay in order to tell whether the relay is correctly repeating. A siphon recorder 26 is associated with the relay 16 for this purpose. This recorder has two windings 28 and 30 insulated from each other and actuating a scribing element 32 for marking on a record tape 34 moved under a scriber by any suitable means not shown.

The winding 30 is in series with the operating winding 36 of a repeating relay 16, and the winding 28 is connected, in series with a variable resistance 38, across the variable resistance 24 in the line 18. The windings 28 and 30 are so connected that the effects of the currents in these windings, upon the scribing element, are opposed; and by means of resistance 38 these currents may be adjusted to have substantially the same maximum amplitude when the repeating relay 16 is functioning properly. Then if the wave of the current delivered to line 18 by relay 16 remains at normal amplitude and has the same form as the wave of the operating current for the relay 16, the recorder 26 will show no deflection unless the relay 16 misses a signal. However, the wave form of the current delivered to the line 18 by relay 16 is not the same as the wave form of the operating current for the relay 16, or in other words, the relay is not distortionless; and consequently in normal operation of the system the recorder 26 will show the difference between the relay operating current and the current delivered to line 18 by the relay 16.

Referring to Fig. 3, line A shows a probable wave form for a two-element printer signal delivered by the network 14 to the relay 16. Line B shows what would be the current wave delivered to line 18 by the relay working perfectly. Line C shows the difference between the two waves, which would appear on the recorder slip 34. Line D shows at 40 what the slip will show if the relay fails to operate on one of the signal pulses, indicated at 42. An inequality between the height of the peaks of line C extending upwardly and those extending downwardly, would indicate a relay bias; while an abnormal width of the peaks of the line C would indicate a relay sensitivity less than normal. In the case of three-element signals similar curves might be marked out.

It is apparent that this method of signal observation not only shows relay failures but also indicates accurately the adjustment of the relay. By opening the circuit of either winding 28 or 30 by means of switches 44 or 46, the full wave form of the current in the circuit of the other winding may be observed.

Fig. 2 shows circuits and apparatus which may be substituted for those to the right of line X—X in Fig. 1. Identical elements in these two figures are given the same reference characters in the two figures. In Fig. 2 a moving coil type of recorder 26' and having a scribing element 32' is operated from an amplifier 50 fed from a transformer 52 having primary windings 28' and 30' and a secondary winding 54. The winding 28' is connected across resistance 24 and corresponds to the winding 28 in Fig 1. The winding 30' is connected across a resistance 38' in series with winding 36 of the repeating relay 16 and corresponds to the winding 30 of Fig 1. Windings 28' and 30' are connected in opposition to each other, with respect to their effect upon their secondary winding 54. The currents in windings 28' and 30' may be adjusted to suitable bias by resistances 24 and 38' respectively, resistance 22 serving to adjust the current in line 18 to the desired value. Amplifier 50 is preferably an electric space discharge amplifier. The combination of transformer 52 and amplifier 50 should be substantially distortionless for frequencies down to, say, one-tenth of one cycle per second.

In the arrangement shown in Fig. 2 undue coupling between the circuit of winding 36 and the circuit of line 18 through windings 30' and 28', can be avoided by having the resistance which shunts windings 28' and 30' small compared to the resistances of the remainder of the circuits in which they are connected. However, if desired, the transformer feeding amplifier 50 may be arranged as in Crisson Patent 1,516,519, November 25, 1924.

What is claimed is:

1. Means for relaying electrical impulses, indicating means for receiving the relayed impulses, and means for recording only changes in the characteristics of said impulses that occur during their transmission through said relaying means.

2. Means for relaying electrical impulses, and scribing means for recording by a single graph the changes in the characteristics of said impulses, produced by the transfer of said impulses through said relaying means.

3. Electromechanically operating means for relaying electrical impulses, and means for recording the difference between the wave shape of said electrical impulses incoming into said first means and the wave shape of resultant impulses outgoing from said first means.

4. Means for relaying electrical impulses, comprising a winding and a movable contact, and means for recording the difference between the wave shape of said electrical impulses incoming into said first means and the wave shape of resultant impulses outgoing from said first means.

5. A telegraph system comprising means for sending telegraph signals, relaying means for said signals, and means for monitoring the operation of said relaying means, said relaying means comprising relatively movable contacts and a winding responsive to said signals for controlling the relative movement of said contacts, and said monitoring means comprising means for producing a graph, and means actuating said graph producing means and responsive to the difference between the characteristics of signals as appearing in said winding and similar characteristics of the resultant relayed signals.

6. A submarine cable telegraph system, comprising means for sending telegraph signals, means for relaying said signals, and means for monitoring the operation of said relaying means, said relaying means comprising an output circuit including relatively movable contacts and an input circuit including a winding responsive to said signals for controlling the relative movement of said contacts, and said monitoring means comprising scribing means, and means controlling said scribing means, said last means comprising two differentially acting circuits, one energized from the relay input circuit and the other energized from the circuit of said relay contacts.

7. The method of monitoring the operation of a relay having an input circuit and having an output circuit including relatively movable contacts, which comprises deriving electrical variations from said input circuit, deriving electrical variations from said output circuit, producing such a relative transmission gain in the variations derived from said input circuit and said output circuit, respectively, that their maximum amplitudes are substantially equal, and then balancing said variations derived from said input circuit against said variations derived from said output circuit, and recording the resultant difference.

In witness whereof, I hereunto subscribe my name this 26th day of February A. D. 1926.

AUSTEN M. CURTIS.